(12) United States Patent
Agrawal et al.

(10) Patent No.: US 9,630,845 B2
(45) Date of Patent: Apr. 25, 2017

(54) HOMOGENEOUS MIXTURES FOR NANOPARTICLE SYNTHESIS

(71) Applicant: Purdue Research Foundation, West Lafayette (IN)

(72) Inventors: Rakesh Agrawal, West Lafayette, IN (US); Bryce Chryst Walker, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 63 days.

(21) Appl. No.: 14/549,878

(22) Filed: Nov. 21, 2014

(65) Prior Publication Data

US 2015/0137039 A1 May 21, 2015

Related U.S. Application Data

(60) Provisional application No. 61/906,926, filed on Nov. 21, 2013.

(51) Int. Cl.
*C01B 19/02* (2006.01)
*C01B 19/00* (2006.01)

(52) U.S. Cl.
CPC ............ *C01B 19/02* (2013.01); *C01B 19/002* (2013.01); *C01B 19/007* (2013.01); *C01P 2002/72* (2013.01); *C01P 2002/85* (2013.01); *C01P 2004/04* (2013.01); *C01P 2004/64* (2013.01)

(58) Field of Classification Search
CPC ...................................................... C01B 19/02
See application file for complete search history.

(56) References Cited

U.S. PATENT DOCUMENTS 3,663,001 A * 5/1972 Ishizuka ................... C21C 7/10
266/149
4,238,373 A * 12/1980 Hardy ..................... C11D 11/04
510/535
2003/0181760 A1* 9/2003 Nakajima ............ B01J 19/0013
562/519

OTHER PUBLICATIONS

Liu et al., "Alkylthiol-Enabled Se Powder Dissolution in Oleylamine at Room Temperature for the Phosphine-Free Synthesis of Copper-Based Quaternary Selenide Nanocrystals," Journal of the American Chemical Society 134(17), pp. 7207-7210, Apr. 2012.*
Braunger, D. Influence of sodium on the growth of polycrystalline Cu(In,Ga)Se2 thin films. Thin Solid Films 361-362, 161-166 (2000).

(Continued)

*Primary Examiner* — Melvin C Mayes
*Assistant Examiner* — James Corno
(74) *Attorney, Agent, or Firm* — Purdue Research Foundation (57) ABSTRACT

Presented herein is a method for obtaining a dissolved selenium liquid mixture from solid selenium. The method involves mixing an amine solvent and a thiol solvent with the solid selenium to produce a liquid intermediate solution and removing a sulfur containing compound from the liquid intermediate solution to produce a dissolved selenium liquid mixture. A method for obtaining dissolved sulfur liquid mixture by mixing an amine with a thiol to produce a liquid solution that dissolves sulfur to produce a dissolved sulfur liquid mixture is also presented. In addition, a method for obtaining a dissolved sulfur and selenium liquid mixture from solid selenium and solid sulfur by mixing an amine solvent with a thiol solvent is presented.

7 Claims, 5 Drawing Sheets

(56) References Cited

OTHER PUBLICATIONS

Jackson, P. et al. New world record efficiency for Cu(In,Ga)Se2 thin-film solar cells beyond 20%. Progress in Photovoltaics: Research and Applications 19, 894-897 (2011).

Todorov, T. K. et al. Beyond 11% Efficiency: Characteristics of State-of-the-Art Cu 2 ZnSn(S,Se) 4 Solar Cells. Advanced Energy Materials 3, 34-38 (2013).

Thomson, J. W., Nagashima, K., et al. From sulfur-amine solutions to metal sulfide nanocrystals: peering into the oleylamine-sulfur black box. Journal of the American Chemical Society 133, 5036-41 (2011).

Todorov, T. K., Gunawan, O., Gokmen, T. & Mitzi, D. B. Solution-processed Cu ( In , Ga) ( S , Se ) 2 absorber yielding a 15 . 2 % efficient solar cell. Library (2012).

Semonin, O. E. et al. Peak external photocurrent quantum efficiency exceeding 100% via MEG in a quantum dot solar cell. Science (New York, N.Y.) 334, 1530-3 (2011).

Guo, Q. et al. Development of CuInSe2 nanocrystal and nanoring inks for low-cost solar cells. Nano letters 8, 2982-7 (2008).

Koo, B., Patel, R. N. & Korgel, B. A. Synthesis of CuInSe(2) nanocrystals with trigonal pyramidal shape. Journal of the American Chemical Society 131, 3134-5 (2009).

Kar, M., Agrawal, R. & Hillhouse, H. W. Formation pathway of CuInSe2 nanocrystals for solar cells. Journal of the American Chemical Society 133, 17239-47 (2011).

Bowers, M. J., Mcbride, J. R. & Rosenthal, S. J. White-light emission from magic-sized cadmium selenide nanocrystals. Journal of the American Chemical Society 127, 15378-9 (2005).

Murray, C. B., Norris, D. J. & Bawendi, M. G. Synthesis and characterization of nearly monodisperse CdE (E=sulfur, selenium, tellurium) semiconductor nanocrystallites. Journal of the American Chemical Society 115, 8706-8715 (1993).

Wang, W. et al., A Novel Mild Route to Nanocrystalline Selenides at Room Temperature. Journal of the American Chemical Society 121,4062-4063 (1999).

Liu, Y. et al. ,Alkylthiol-enabled Se powder dissolution in oleylamine at room temperature for the phosphine-free synthesis of copper-based quaternary selenide nanocrystals. Journal of the American Chemical Society 134,7207-10 (2012).

Wei, Y., Yang, J., Lin, A. W. H. & Ying, J. Y., Highly Reactive Se Precursor for the Phosphine-Free Synthesis of Metal Selenide Nanocrystals. Chemistry of Materials 22,5672-5677 (2010).

Henkes, A. E., Vasquez, Y. & Schaak, R. E., Converting metals into phosphides: a general strategy for the synthesis of metal phosphide nanocrystals. Journal of the American Chemical Society 129, 1896-7 (2007).

Chiang, R.-K. & Chiang, R.-T., Formation of hollow Ni2P nanoparticles based on the nanoscale Kirkendall effect. Inorganic chemistry 46, 369-71 (2007).

Singh, A., Geaney, H., Laffir, F. & Ryan, K. M., Colloidal synthesis of wurtzite Cu2ZnSnS4 nanorods and their perpendicular assembly. Journal of the American Chemical Society 134, 2910-3 (2012).

Riha, S. C., Parkinson, B. A. & Prieto, A. L., Compositionally tunable Cu2ZnSn(S(1-x)Se(x))4 nanocrystals: probing the effect of Se-inclusion in mixed chalcogenide thin films. Journal of the American Chemical Society 133, 15272-5 (2011).

Ma, W., Luther, J. M., Zheng, H., Wu, Y. & Alivisatos, A. P. ,Photovoltaic Devices Employing Ternary PbS x Se 1-x Nanocrystals 2009.5-9 (2009).

Yin, Y. & Alivisatos A. P., Colloidal nanocrystal synthesis and the organic-inorganic interface. Nature 437, 664-70 (2005).

Hessel, C. M. et al., Copper selenide nanocrystals for photothermal therapy. Nano letters 11, 2560-6 (2011).

Wang, Q. & Webster, T. J., Nanostructured selenium for preventing biofilm formation on polycarbonate medical devices. Journal of biomedical materials research. Part A 100, 3205-10 (2012).

Wang, W. et al. Preparation and characterization of nanocrystalline Cu2-xSe by a novel solvothermal pathway. Journal of Materials Chemistry 8, 2321-2322 (1998).

Cademartiri, L. & Ozin, G. A. Emerging strategies for the synthesis of highly monodisperse colloidal nano structures. Philosophical transactions. Series A, Mathematical, physical, and engineering sciences 368, 4229-48 (2010).

Newman, J. D. S. & Blanchard, G. J. Formation of gold nanoparticles using amine reducing agents. Langmuir : the ACS journal of surfaces and colloids 22, 5882-7 (2006).

\* cited by examiner

(a): Cu$_2$Se made from soluble selenium and removal of sulfur components
(b): Cu$_2$Se nanoparticles made using soluble selenium in leylamine and dodecanethiol
(c): Cu$_2$(S,Se) nanoparticles madeby using mixed soluble sulfur and selenium

— HOMOGENEOUS MIXTURES FOR NANOPARTICLE SYNTHESIS —

CROSS-REFERENCE TO RELATED APPLICATIONS

The present U.S. patent application is related to and claims the priority benefit of U.S. Provisional Patent Application Ser. No. 61/906,926, filed Nov. 21, 2013, the contents of which is hereby incorporated by reference in its entirety into this disclosure.

STATEMENT OF GOVERNMENT SUPPORT

This invention was made with government support under Grant Number DGE0833366 awarded by the National Science Foundation. The government has certain rights in the invention.

TECHNICAL FIELD

The present disclosure generally relates to a method for dissolution of selenium and sulfur, and in particular to the preparation of nanoparticles.

BACKGROUND

Selenide nanocrystals are important materials with applications throughout electronics, solar cells, light emitting diodes (LED), and biology. These materials range from elemental to binary, tertiary, and quaternary compounds and involve elements throughout the periodic table. Despite the variety of metal precursors, reaction solvents, and temperatures there is a general singularity of the selenium source coming from dissolved/reacted selenium in tri-octyl phosphine (TOP). TOP has limitations to use due to the cost, stability, and toxicity, but importantly also due to the possibility of phosphorous incorporation and contamination of the final material under reaction conditions.

Many attempts have been made to replace TOP, but each faces significant limitations. Organoselenide chemicals are generally toxic and unstable. Soluble selenium in ethylenediamine is limited by the low boiling point temperature of the solvent and general poor solubility. Oleylamine (OLA) used alone can only dissolve small quantities of selenium and only at higher temperatures due to the relatively weak reducing ability of amines unless coupled with a reducing agent such as the alkali borohydrides which then introduces boron and alkali ion contaminants to the system, altering growth mechanisms as well as electronic properties.

Therefore, there is an unmet need for need for a homogeneous solution to reproducibly generate controlled size nanoparticles.

SUMMARY

In one embodiment, a method for obtaining a dissolved selenium liquid mixture from solid selenium is presented. The method comprises mixing an amine solvent and a thiol solvent with the solid selenium to produce a liquid intermediate solution and removing a sulfur containing compound from the liquid intermediate solution to produce a dissolved selenium liquid mixture.

In another embodiment, a method for obtaining dissolved sulfur liquid mixture by mixing an amine with a thiol to produce a liquid solution that dissolves sulfur to produce a dissolved sulfur liquid mixture is also presented.

In yet another embodiment, a method for obtaining a dissolved sulfur and selenium liquid mixture from solid selenium and solid sulfur by mixing an amine solvent with a thiol solvent is presented.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates. At least one embodiment of the present disclosure will be described and shown, and this application may show and/or describe other embodiments of the present disclosure. It is understood that any reference to "the disclosure" is a reference to an embodiment of a family of disclosures, with no single embodiment including an apparatus, process, or composition that should be included in all embodiments, unless otherwise stated. Further, although there may be discussion with regards to "advantages" provided by some embodiments of the present disclosure, it is understood that yet other embodiments may not include those same advantages, or may include yet different advantages. Any advantages described herein are not to be construed as limiting to any of the claims.

Presented herein is a novel disclosure of versatile solutions of concentrated selenium within arrays of primary, secondary and tertiary amines without the presence of a contaminant source such as phosphorus, sulfur, sodium, and boron. This provides an unprecedented opportunity to synthesize pure selenide materials, specifically pure selenide nanoparticles, as needed for high performance electronic applications. This also provides opportunities to conduct additional chemical reactions with a pure selenium solution, and controllably create mixed chalcogen materials.

Further disclosed herein is a novel method to create a solution of dissolved selenium, in high concentration, with the flexibility of a wide range of boiling points. The disclosed method can be particularly useful for the formation of nanomaterials, due to the need for a homogeneous solution to reproducibly generate controlled size nanoparticles. Although developed for this application, the flexibility of the approach enables tailor-made routes for other applications.

Selenium can be dissolved in oleylamine through the assistance of added thiol at room temperature and pressure and remove it from fouling dispersion of nanoparticles during post-processing. Liu et al. showed a similar dissolution route and used it for the formation of nanoparticles. However, Liu et al. specified the need for only dodecanethiol and aleylamine in order for the process to be successful. The process disclosed herein expands Liu et al.'s process to include amines and thiols in general, and in addition, the beneficial ability to remove the thiol from solution and prevent it from contaminating the final system.

Figure 1A:
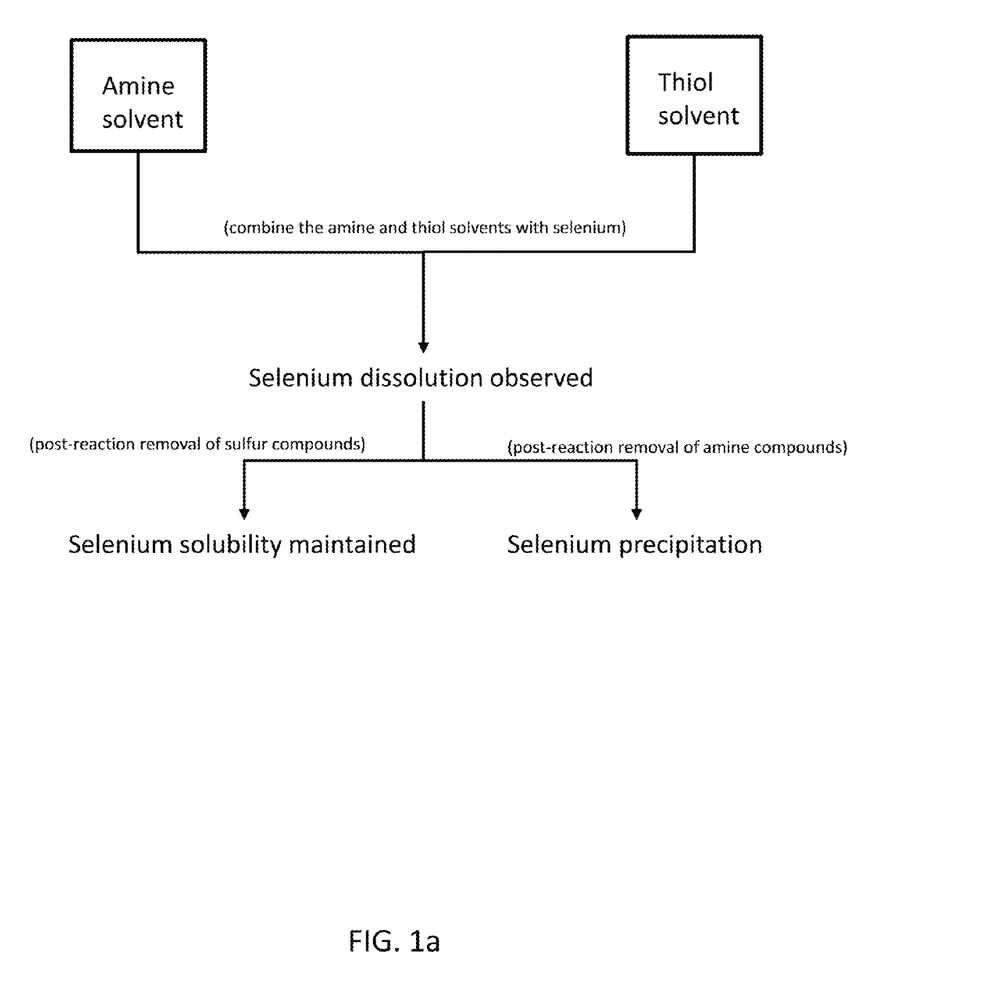
FIG. 1a illustrates that post-reaction removal of sulfur compounds can be performed while maintaining solubility while removal of amine compounds results in selenium precipitation.

There is no observed dissolution when selenium is in either an amine-only solvent or a thiol-only solvent; however, when both the thiol solvent and amine solvent are combined together, a solution is formed. All combinations tested through the use of thiols ranging in size from C2-C16, and amines varied from C2-C24, showed positive selenium dissolution. Therefore, the novelty is in the mixture of the two solvents, because neither amines nor thiols alone readily dissolve selenium at room temperature. Further, referring to FIG. 1a, post-reaction removal of sulfur compounds can then be performed while maintaining solubility, while removal of amine compounds results in selenium precipitation.

Figure 1B:
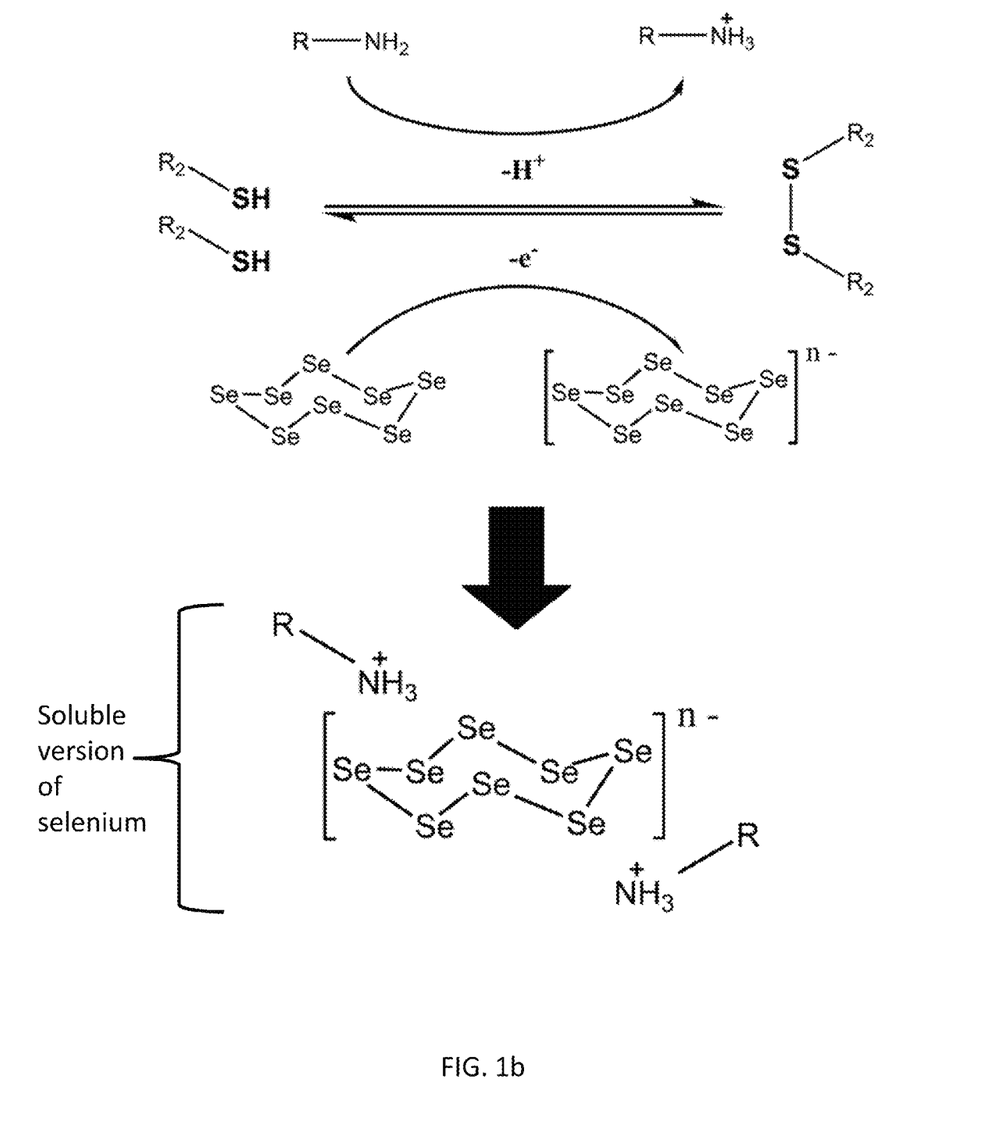
FIG. 1b depicts the disclosed reaction scheme for the dissolution and then purification of selenium in amine and thiol solvents.

FIG. 1b depicts the disclosed reaction mechanism which results in the dissolution of selenium in an amine and thiol solution. This mechanism relies on the thiol-disulfide redox couple which enables the reduction of selenium to its anionic form as well as the formation of the ammonium ion. It is the complexation of these two products which results in a soluble version of selenium.

Figure 2:
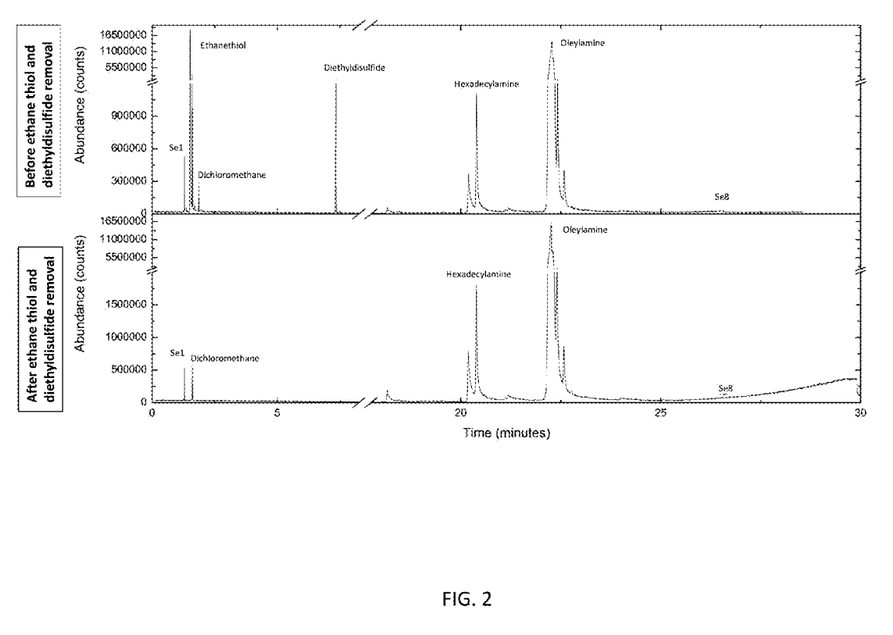
FIG. 2 depicts the gas chromatography-mass spectroscopy (GC-MS) data of selenium dissolved in oleylamine before (top) and after (bottom) ethanethiol and diethyldisulfide removal. Components observed are: $Se_1$, ethanethiol, dichloromethane used as dilutant, diethyldisulfide, hexadecylamine contaminant in oleylamine, oleylamine, and $Se_8$.

Referring to FIG. 2, gas chromatography-mass spectroscopy (GCMS) was used to analyze the solution formed from combining selenium, a thiol, and a primary amine. Of note is the capability for complete removal of sulfur containing components enabling pure selenide reactions. The evidence is reported through GCMS the presence of only four components: the amine and thiol added initially, a disulfide formed from the thiol, and elemental selenium in the allotropes $Se_1$ and $Se_8$. There being no evidence of an organoselenium chemical formation, indicates selenium exists in a solvated or complexed form. The mechanism of dissolution depends on the reduction potential of the thiol to disulfide reaction in a manner similar to results shown for borohydride although it should be noted that the solution is a dark red rather than colorless that is observed when using borohydride, suggesting a different end product. The thiol oxidation and subsequent selenium reduction is enhanced by the basic environment provided from the amine. Attempts to utilize non-amine bases did not result in dissolution though, and investigation of the final amine-thiol-selenium solution through infrared spectroscopy shows that the amine actively participates in stabilizing the final selenium anion. The lack of other compounds in the GCMS data implies that the selenium exists as a solvated complex hypothesized to be through a dissolution mechanism outlined in FIG. 1b where the final state is similar to that reported for dissolved sulfur in amine. In the absence of oxidizing agents, this solution is highly stable; successful formation and storage of solutions for more than a year have been performed without any observed precipitation.

Figure 3:
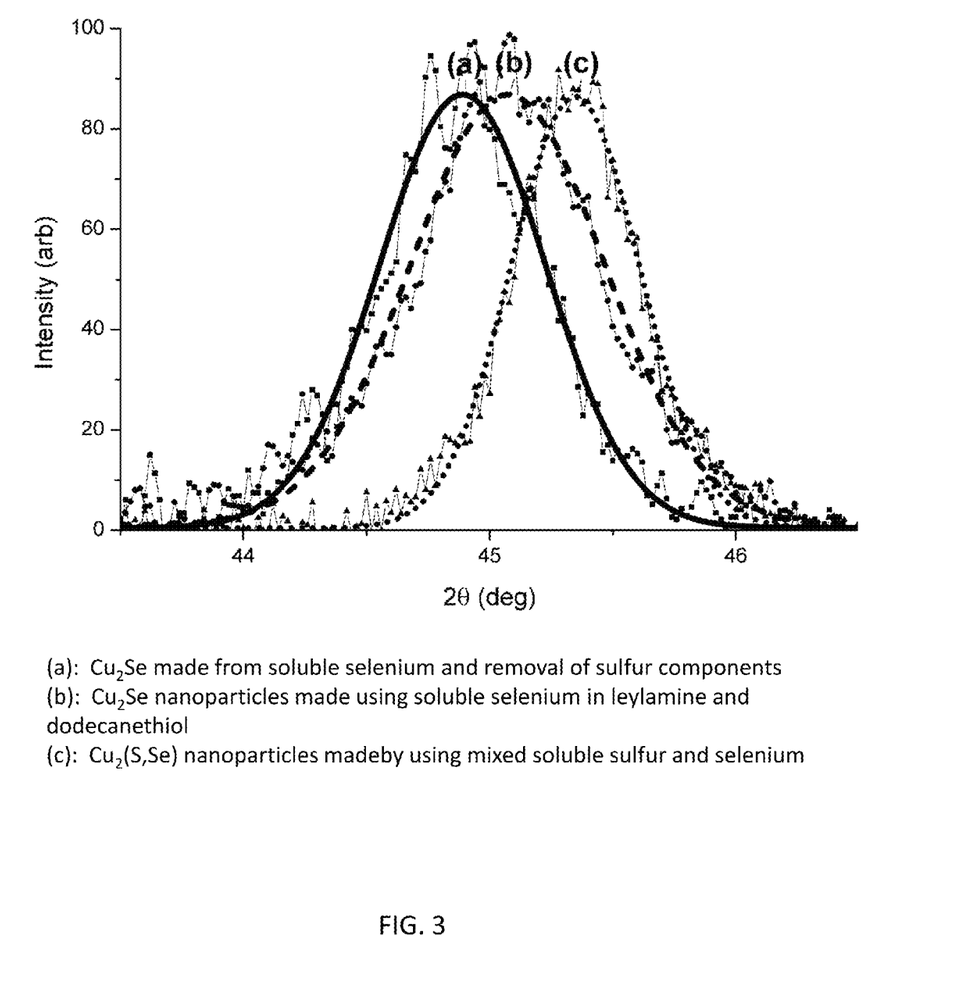
FIG. 3 depicts powder X-ray diffraction (pXRD) data of the $Cu_2Se$ 220 peak with overlaid Gaussian fits for: (a) $Cu_2Se$ made from soluble selenium and removal of sulfur components (b) $Cu_2Se$ nanoparticles made using soluble selenium in oleylamine and dodecanethiol showing sulfur incorporation into the lattice from the thiol and resulting shift in peak location (c) $Cu_2(S,Se)$ nanoparticles created by using mixed soluble sulfur and selenium.

However, the thiol and disulfide compounds remaining in the solution are active reactants in nanoparticle synthesis and will result in sulfur contamination through their incorporation in nanoparticles. Referring to FIG. 3, attempts to create cuprous-selenide nanoparticles through use of oleylamine and dodecanethiol show this contamination both in powder x-ray diffraction (pXRD) as well as field emission scanning electron microscope (FE-SEM) based energy dispersive x-ray spectroscopy (EDS). EDS data show the relative selenium content relative to total sulfur and selenium to be (a) 100%, (b) 86%, and (c) 59%. Although there are applications where contamination by a fellow chalcogen is advantageous, it is still highly desirable to make pure selenide systems free from contamination and controllably add other chalcogens when desired.

Once selenium has dissolved, concentration of sulfur containing species, for example thiol and disulfides, are reduced in the final mixture. The extent of sulfur removal is such that at least more than 20% of sulfur containing compounds have been removed and preferably more than 50%, and most preferably more than 99%. For example at lower limits of sulfur removal, only more volatile sulfur species are removed.

Therefore, in order to provide reduced-sulfur and sulfur-free selenide solutions, the options of removing the thiol and its disulfide post-dissolution were successfully explored.

It is possible to dissolve selenium in many thiol and amine mixtures. To be precise, all combinations tested through the use of thiols ranging in size from C2-C16, and amines varied from C2-C24, showed positive selenium dissolution. Also, it was determined that at least one thiol molecule was needed to dissolve roughly four selenium atoms when chemicals are kept free from oxygen.

With an array of solution options now available the necessity of both components to stabilize the final selenium solution was tested. This was done through utilizing two chemicals of dissimilar boiling points and then evaporating the more volatile component at elevated temperatures. For a volatile amine and nearly non-volatile thiol combination of butylamine and dodecanethiol, selenium promptly fell out of solution upon evaporation of the butylamine. In the case of a volatile ethanethiol and nearly non-volatile oleylamine combination, the selenium stayed in solution (FIG. 1a) even after removal of the ethanethiol.

It is therefore possible to create a solution of soluble selenium in amine free from other contaminants by introducing a post-dissolution thiol removal step. This requires that the thiol used has dissimilar properties to the amine. Two candidate pathways have been developed and are disclosed: either use a thiol that is significantly larger than the amine so that it can be separated from solution as a solid, or utilize a thiol that is significantly smaller than the amine so that the thiol and disulfide formed can be removed in the vapor phase. Oleylamine and other heavier amines tend to be preferred over small alkylamines for nanoparticle synthesis, and therefore the focus herein has been on developing the latter.

Due to its being the lightest thiol readily available, ethanethiol was as the exemplary thiol. Ethanethiol boils at roughly 35° C. and has high vapor pressure at lower temperatures to allow facile post reaction removal. The disulfide formed through selenium reduction is not as volatile. Pure phase diethyl disulfide has a normal boiling point around 154° C. but would require a higher temperature for complete removal from a liquid mixture. The higher temperatures required to remove the disulfide completely has resulted in visible deposition of selenium on the sides of our condenser, and is deemed to be unsuitable. A secondary route is to reduce the pressure of the solution to enable removal of ethyl disulfide at lower temperatures. Ethyl disulfide has a room temperature vapor pressure of 5.7 mbar, while oleylamine has an estimated value several orders of magnitude smaller at close to 1 nanobar, and is kept from vaporizing. To completely extract the diethyl disulfide we raise the temperature under vacuum until we reach the normal refluxing temperature under vacuum for oleylamine, which in our lab set-up is ~120° C. Complete removal of all sulfur components is confirmed through GCMS (FIG. 2). Due to the reducing properties of amines, the selenium-amine solution is stable in the absence of oxidizers even at high selenium concentrations exceeding 2.5 molar, and can be stored at room temperature for later use.

Utilization of this selenium source was successful in making nanoparticles of selenide materials without any sulfur incorporation. Referring to FIG. 3, the change in EDS as well as pXRD is reported for pure cuprous selenide nanoparticles, in comparison with the initial oleylamine-dodecanethiol solution.

As mentioned above, it was surprising that the selenium dissolution was successful with all thiols and amines utilized. The nature of the amine is not essential to the success of dissolution as primary, secondary, tertiary, diamines, and triamines have all resulted in solvated selenium. The method can be generalized by using and $R_4$—SH, where $R_1$, $R_2$, and $R_3$ represent any alkane, alkene, alkyne, functional group/s, and/or hydrogen that connect to the nitrogen of the amine and $R_4$ represents any alkane, alkene, alkyne, functional group/s, and/or hydrogen that connect to the sulfur of the thiol. The potential for each R group to consist of multiple amine, thiol, and/or other functional groups are included. As well as the potential of cyclic compounds or joined compounds such that a single R group could represent multiple R groups in the diagram. The rate of dissolution is structure dependent with the faster reactions involving primary amines and the slower involve tertiary amines while diamines were observed to have a rate between tertiary and secondary. The utilization of these other types of amines may prove valuable in various applications either individually, or as a mixture.

Also of importance is that light amines in the presence of thiol were also observed to be faster than heavier alkyl amines. These two aspects are expected for the nature of the disclosed dissolution. In addition to the desirability of faster dissolution, the use of a lighter amine is also beneficial for subsequent ease of removal relative to oleylamine, wherein light amines consist of compounds of seventeen carbons or less and preferably twelve carbons or less, and most preferably four carbons or less.

Figure 4:
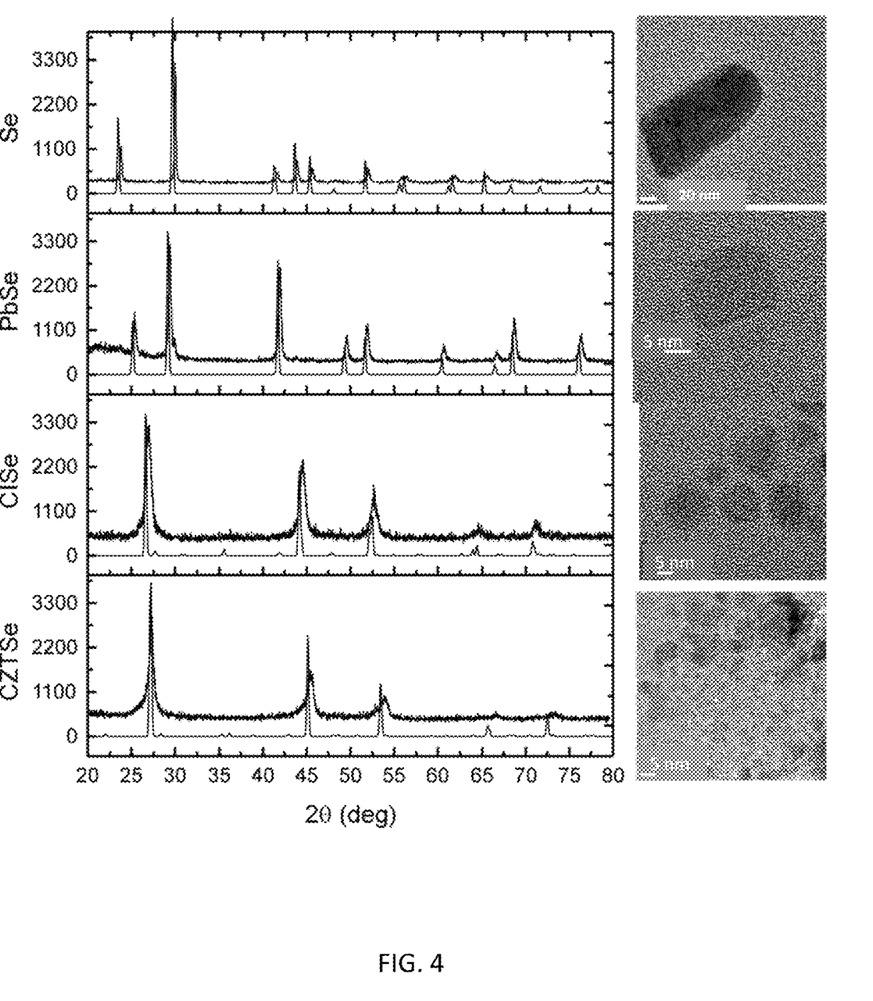
FIG. 4 depicts TEM images and pXRD data of selenium, lead selenide (PbSe), copper-indium selenide (CISe), and copper-zinc-tin-selenide (CZTSe) nanoparticles with reported pXRD standards for the bulk material.

With the solution of dissolved selenium the formation of various selenide nanoparticles is easily accomplished. Referring to FIG. 4, in addition to the cuprous selenide addressed above, elemental selenium (Se), binary lead-selenide (PbSe), tertiary copper-indium-diselenide (CISe), and quaternary dicopper-zinc-tin-tetraselenide (CZTSe) nanomaterials have been successfully formed, as confirmed through pXRD, TEM, and EDS. Conditions for the individual nanoparticles have not been optimized, but the results are strong enough to show the validity of pure selenide nanomaterials free from contamination of phosphorous, boron, and even sulfur.

In addition to the ability of this method to dissolve selenium, it can also dissolve sulfur to make a sulfur in amine solution where organic sulfur containing species, such as thiol and disulfide, can either remain or be removed in a manner similar to making dissolved selenium. This can be used for sulfide materials.

The value of the solution is not only in the ability to form pure selenide or selenide materials, but also in the ability to controllably add sulfur into the solution of selenium and form a mixed chalcogen compound. The formation of mixed chalcogenide nanoparticles can be created through controlling the reactivity of the individual components when utilizing hot injection from a homogenous mixture of the two components in solution. The disclosed approach allows the dissolution of sulfur in addition to selenium in an amine. By mixing sulfur and selenium to the desired ratios, dissolving in oleylamine and ethanethiol, and then removing the organosulfide compounds a solution that was enabled the formation of homogenous cuprous-sulfoselenide nanoparticles with a single peak in the pXRD spectra was successfully created (FIG. 3).

Example 1

Chemicals

Selenium powder (100 mesh 99.99% Aldrich), selenium pellets (<5 mm 99.999% Aldrich), sulfur powder (99.98% Aldrich), oleylamine (80-90% Acros-Organics), ethanethiol (97% Aldrich), butylamine (99.5% Sigma-Aldrich), 1-dodecanethiol (98% Aldrich), 1-propanethiol (99% Aldrich), hexane, oleic acid (99% Sigma-Aldrich), octadecene, lead oxide (99.99% Aldrich), copper acetylacetonate (99.99% Aldrich), indium acetylacetonate (99.99% Aldrich), zinc acetylacetonate hydrate powder (99.995% Aldrich), tin (IV) bis(acetylacetonate) dibromide (98% Aldrich), isopropanol, toluene, argon. All chemicals were used as received unless otherwise noted.

Selenium Dissolution

At room temperature combine selenium with desired amine and thiol. Let the solution react until selenium is completely dissolved (between 1 second and 1 hour depending on conditions).

Gas Chromatography-Mass Spectroscopy (GC-MS) Measurements

The capillary gas chromatography/mass spectrometry analyses were carried out using an Agilent 5975C (Agilent Labs, Santa Clara, Calif.) mass spectrometer system. Typical electron energy was 70 eV with the ion source temperature maintained at 250° C. The individual components were separated using a 30 meter DB-5 capillary column (250 μm i.d.×0.25 μm film thickness). The initial column temperature was set at 40° C. (for 3 minutes) and programmed to 320° C. at 10.0° C. per minute. The flow rate is typically set at 1 ml/min. The injector temperature was set at 250° C.

Fourier Transform Infrared Spectroscopy (FTIR) Measurements

Samples were compressed between two potassium bromide disks. The Thermo-Nicolet Nexus 670 FTIR instrument was used to analyze the specimens after allowing the system to purge for ten minutes with nitrogen. Measurements were made in transmission mode by collecting 64 scans with a resolution of 2 $cm^{-1}$ wavelength.

Sulfur-Free 1 Molar Selenium Solution 10 ml of Oleylamine (OLA), 10 mmol of selenium powder (789.6 mg), and 5 mmol of ethanethiol were added to a 100 ml round bottom three neck flask fitted with a condenser, thermocouple, and septa on the three ports. Heat was controlled to 40° C. and gentle vacuum was pulled for five minutes followed by one minute of argon back fill. This vacuum and back fill procedure was repeated three times to quickly remove oxygen from the system. After the third argon back fill the vacuum was returned and slowly increased in intensity as boiling became less-violent. Once the system was no longer actively boiling at 40° C., the temperature was increased until it was able to reach 120° C. under vacuum. At this point the solution was deemed to only contain OLA and dissolved selenium and was cooled under a blanket of argon to room temperature for use in subsequent reactions.

Selenium Nanoparticle Formation

Take 5 ml of the sulfur-free selenium solution described above and inject into 20 ml of hexane that had been stored under atmospheric conditions. The sudden oxidation of the solution breaks the reduced selenium stability and results in the rapid formation of selenium nanoparticles. The nanoparticles were cleaned from extra oleylamine through washing with isopropanol and hexane.

Cuprous Selenide and Cuprous Sulfo-Selenide Nanoparticle Formation 1 mmol copper acetylacetonate (Cu-Acac) was added to 10 ml OLA in a three neck flask assembly as described for selenium dissolution. After purging the system of oxygen the temperature was raised to 225° C. and the appropriate 0.5 mmol of chalcogenide in solution was injected. The reaction was allowed to continue for 1 minute followed by removal of heat and natural cooling to room temperature. The nanoparticles were cleaned from extra solvent through washing with isopropanol and hexane.

Lead Selenide Nanoparticle Formation 1 mmol of lead oxide, 10 ml octadecene, and 150 µl of oleic acid were added to a three neck flask assembly described above. After purging the system of gaseous oxygen the temperature was raised to 140° C. for 30 minutes to allow the formation of lead oleate. Three milliliters of one third molar sulfur-free selenium solution was injected and the reaction was allowed to continue for 1 minute followed by removal of heat and natural cooling to room temperature. The nanoparticles were cleaned from extra solvent through washing with isopropanol and hexane.

Copper Indium Selenide (CISe) Nanoparticle Formation 1 mmol copper acetylacetonate (Cu-Acac), 1 mmol indium acetylacetonate (In-Acac), and 10 ml OLA was added to a three neck flask assembly as described for selenium dissolution. After purging the system of oxygen the temperature was raised to 225° C. and three milliliters of one molar sulfur-free selenium solution was injected and the reaction was allowed to continue for 30 minutes followed by removal of heat and natural cooling to room temperature. The nanoparticles were cleaned from extra solvent through washing with isopropanol and hexane.

Copper Zinc Tin Selenide (CZTSe) Nanoparticle Formation 2 mmol copper acetylacetonate (Cu-Acac), 1 mmol zinc acetylacetonate (Zn-Acac), 1 mmol tin acetylacetonate, and 6 ml OLA was added to a three neck flask assembly as described for selenium dissolution. After purging the system of oxygen the temperature at 120° C. the solution was cooled to room temperature. Meanwhile 10 ml OLA was in a separate flask, purged of oxygen and heated to 250° C. and six milliliters of one molar sulfur-free selenium solution was injected with 6 ml of the Cu—Zn—Sn solution and the reaction was allowed to continue for 30 minutes followed by removal of heat and natural cooling to room temperature. The nanoparticles were cleaned from extra solvent through washing with isopropanol and hexane.

pXRD Measurements

PXRD was performed with Scintag X2 diffractometer employing Cu Kα radiation at standard room temperature and pressure conditions. Nanocrystals were coated over a fused quartz substrate.

Field Emission Scanning Electron Microscope Energy-Dispersive X-Ray Spectroscopy (FE-SEM EDS) Measurements EDS measurements of nanoparticles on a silicon wafer substrate were performed in a FEI Quanta 3D FEG Dual-beam scanning electron microscope equipped with a Oxford INCA Xstream-2 silicon drift detector with Xmax80 window and an accelerating voltage of 20 kV.

The foregoing reflects a new and novel method to form a homogenous solution of selenium without contamination from phosphorus, boron, or sulfur. The capability of the disclosed method shows the ability to utilize a reducing agent, and then remove that agent while maintaining the desired solubility. It should be noted that although selenium was used to demonstrate the principles set forth in this disclosure, the feasibility of other utilizations can also be used, and thus are also covered by this disclosure. The potential of this technique has been shown through using volatile mercaptans, and can create a vast family of selenium and selenide nanoparticles as well as mixed chalcogen materials. Although selenium is the exemplary component herein, the feasibility of other utilizations should also be considered. The versatility of the process allows utilization of amines under a wide range of properties which allows greater flexibility in the design of synthesis routes than had been previously realized. The dissolved selenium produced utilizing the method disclosed herein allows for the formation of nanoparticles. An example of this involves the formation of kesterite nanocrystals with controlled ratios of sulfur and selenium. The herein disclosed method was used to produce homogeneously distributed mixtures of the chalcogens sulfur and selenium. The process can also be readily applied to other chalcogenide systems. Other chemical reactions for use in biological applications are also possible using the dissolved selenium and/or dissolved sulfur.

Additional disclosure is found in Appendix-A and Appendix-B, filed herewith, entirety of which are incorporated herein by reference into the present disclosure.

Those skilled in the art will recognize that numerous modifications can be made to the specific implementations described above. Therefore, the scope of the present disclosure is not to be limited to the specific embodiments illustrated and described above.

REFERENCES

1. Adams, W. & Day, R. The Action of Light on Selenium. *Proceedings of the Royal Society of London* 25, 113-117 (1876).
2. Jackson, P. et al. New world record efficiency for Cu(In, Ga)Se2 thin-film solar cells beyond 20%. *Progress in Photovoltaics: Research and Applications* 19, 894-897 (2011).
3. Todorov, T. K. et al. Beyond 11% Efficiency: Characteristics of State-of-the-Art Cu 2 ZnSn(S,Se) 4 Solar Cells. *Advanced Energy Materials* 3, 34-38 (2013).

4. Walker, B. C. & Agrawal, R. Grain growth enhancement of selenide CIGSe nanoparticles to densified films using copper selenides. in 2012 38*th IEEE Photovoltaic Specialists Conference* 002654-002657 (IEEE, 2012). doi:10.1109/PVSC.2012.6318141
5. Todorov, T. K., Gunawan, O., Gokmen, T. & Mitzi, D. B. Solution-processed Cu (In, Ga) (S, Se) 2 absorber yielding a 15. 2% efficient solar cell. *Library* (2012). doi:10.1002/pip.
6. Semonin, O. E. et al. Peak external photocurrent quantum efficiency exceeding 100% via MEG in a quantum dot solar cell. *Science (New York, N.Y.)* 334, 1530-3 (2011).
7. Guo, Q. et al. Development of CuInSe2 nanocrystal and nanoring inks for low-cost solar cells. *Nano letters* 8, 2982-7 (2008).
8. Koo, B., Patel, R. N. & Korgel, B. A. Synthesis of CuInSe(2) nanocrystals with trigonal pyramidal shape. *Journal of the American Chemical Society* 131, 3134-5 (2009).
9. Kar, M., Agrawal, R. & Hillhouse, H. W. Formation pathway of CuInSe2 nanocrystals for solar cells. *Journal of the American Chemical Society* 133, 17239-47 (2011).
10. Bowers, M. J., McBride, J. R. & Rosenthal, S. J. White-light emission from magic-sized cadmium selenide nanocrystals. *Journal of the American Chemical Society* 127, 15378-9 (2005).
11. Murray, C. B., Norris, D. J. & Bawendi, M. G. Synthesis and characterization of nearly monodisperse CdE (E=sulfur, selenium, tellurium) semiconductor nanocrystallites. *Journal of the American Chemical Society* 115, 8706-8715 (1993).
12. Wang, W. et al. A Novel Mild Route to Nanocrystalline Selenides at Room Temperature. *Journal of the American Chemical Society* 121, 4062-4063 (1999).
13. Liu, Y. et al. Alkylthiol-enabled Se powder dissolution in oleylamine at room temperature for the phosphine-free synthesis of copper-based quaternary selenide nanocrystals. *Journal of the American Chemical Society* 134, 7207-10 (2012).
14. Wei, Y., Yang, J., Lin, A. W. H. & Ying, J. Y. Highly Reactive Se Precursor for the Phosphine-Free Synthesis of Metal Selenide Nanocrystals. *Chemistry of Materials* 22, 5672-5677 (2010).
15. Henkes, A. E., Vasquez, Y. & Schaak, R. E. Converting metals into phosphides: a general strategy for the synthesis of metal phosphide nanocrystals. *Journal of the American Chemical Society* 129, 1896-7 (2007).
16. Chiang, R.-K. & Chiang, R.-T. Formation of hollow Ni2P nanoparticles based on the nanoscale Kirkendall effect. *Inorganic chemistry* 46, 369-71 (2007).
17. Singh, A., Geaney, H., Laffir, F. & Ryan, K. M. Colloidal synthesis of wurtzite Cu2ZnSnS4 nanorods and their perpendicular assembly. *Journal of the American Chemical Society* 134, 2910-3 (2012).
18. Riha, S. C., Parkinson, B. A. & Prieto, A. L. Compositionally tunable Cu2ZnSn(S(1-x)Se(x))4 nanocrystals: probing the effect of Se-inclusion in mixed chalcogenide thin films. *Journal of the American Chemical Society* 133, 15272-5 (2011).
19. Ma, W., Luther, J. M., Zheng, H., Wu, Y. & Alivisatos, A. P. Photovoltaic Devices Employing Ternary PbS x Se 1-x Nanocrystals 2009. 5-9 (2009).
20. Yin, Y. & Alivisatos, a P. Colloidal nanocrystal synthesis and the organic-inorganic interface. *Nature* 437, 664-70 (2005).
21. Hessel, C. M. et al. Copper selenide nanocrystals for photothermal therapy. *Nano letters* 11, 2560-6 (2011).
22. Wang, Q. & Webster, T. J. Nanostructured selenium for preventing biofilm formation on polycarbonate medical devices. *Journal of biomedical materials research. Part A* 100, 3205-10 (2012).
23. Wang, W. et al. Preparation and characterization of nanocrystalline Cu2-xSe by a novel solvothermal pathway. *Journal of Materials Chemistry* 8, 2321-2322 (1998).
24. Cademartiri, L. & Ozin, G. a. Emerging strategies for the synthesis of highly monodisperse colloidal nanostructures. *Philosophical transactions. Series A, Mathematical, physical, and engineering sciences* 368, 4229-48 (2010).
25. Newman, J. D. S. & Blanchard, G. J. Formation of gold nanoparticles using amine reducing agents. *Langmuir: the ACS journal of surfaces and colloids* 22, 5882-7 (2006).
26. Braunger, D. Influence of sodium on the growth of polycrystalline Cu(In,Ga)Se2 thin films. *Thin Solid Films* 361-362, 161-166 (2000).
27. Jouikov, V. & Simonet, J. in *Encyclopedia of Electrochemistry* (Wiley-VCH Verlag GmbH & Co. KGaA, 2007). doi:10.1002/9783527610426.bard080009
28. Thomson, J. W., Nagashima, K., Macdonald, P. M. & Ozin, G. a. From sulfur-amine solutions to metal sulfide nanocrystals: peering into the oleylamine-sulfur black box. *Journal of the American Chemical Society* 133, 5036-41 (2011).
29. US EPA. Estimation Programs Interface Suite™ for Microsoft® Windows, v 4.11. (2013).

We claim:
1. A method for obtaining a dissolved selenium liquid mixture from solid selenium, comprising:
    mixing an amine solvent and a thiol solvent with the solid selenium to produce a liquid intermediate solution; and
    removing a sulfur containing compound from the liquid intermediate solution to produce a dissolved selenium liquid mixture.
2. The method of claim 1, wherein the amine is a primary, a secondary, a tertiary amine, or a mixture thereof.
3. The method of claim 1, wherein the amine is a diamine, a triamine, a compound with multiple amino groups, or a mixture thereof.
4. The method of claim 1, wherein the amine is represented by and the thiol is represented by $R_4$-SH, wherein $R_1$, $R_2$, $R_3$, and $R_4$ are independently selected from the group consisting of alkane, alkene, alkyne, functional groups, and hydrogen.
5. The method of claim 1, wherein the sulfur containing compound is a thiol or a disulfide.
6. The method of claim 5, wherein at least 99% of the sulfur containing compound is removed.
7. The method of claim 5, wherein the sulfur containing compound is the thiol solvent.

* * * * *